(12) United States Patent
Nonaka et al.

(10) Patent No.: US 11,236,004 B2
(45) Date of Patent: Feb. 1, 2022

(54) MANUFACTURING METHOD AND MANUFACTURING APPARATUS OF GLASS PANEL FOR GLASS PANEL UNIT

(71) Applicant: PANASONIC INTELLECTUAL PROPERTY MANAGEMENT CO., LTD., Osaka (JP)

(72) Inventors: Masataka Nonaka, Osaka (JP); Eiichi Uriu, Osaka (JP); Kazuya Hasegawa, Osaka (JP); Tasuku Ishibashi, Osaka (JP); Hiroyuki Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 409 days.

(21) Appl. No.: 16/316,862

(22) PCT Filed: Jul. 10, 2017

(86) PCT No.: PCT/JP2017/025120
§ 371 (c)(1),
(2) Date: Jan. 10, 2019

(87) PCT Pub. No.: WO2018/016366
PCT Pub. Date: Jan. 25, 2018

(65) Prior Publication Data
US 2019/0241457 A1    Aug. 8, 2019

(30) Foreign Application Priority Data

Jul. 21, 2016   (JP) .............................. JP2016-143803

(51) Int. Cl.
*C03B 23/203*   (2006.01)
*C03B 18/02*    (2006.01)
(Continued)

(52) U.S. Cl.
CPC ............ *C03B 23/203* (2013.01); *C03B 18/02* (2013.01); *C03B 23/245* (2013.01);
(Continued)

(58) Field of Classification Search
CPC ......... C03B 13/01; C03B 13/06; C03B 13/08; C03B 23/20; C03B 23/203; C03B 23/24
See application file for complete search history.

(56) References Cited

U.S. PATENT DOCUMENTS 5,885,315 A * 3/1999 Fredholm ............... C03B 23/02
                                                        65/102
6,199,404 B1 * 3/2001 Kawai .................. C03C 17/002
                                                        427/383.5
(Continued)

FOREIGN PATENT DOCUMENTS

JP    2001-354949 A    12/2001
JP    2003-089537 A     3/2003
(Continued)

OTHER PUBLICATIONS

International Search Report and Written Opinion issued in International Patent Application No. PCT/JP2017/025120, dated Sep. 19, 2017; with partial English translation.

*Primary Examiner* — Cynthia Szewczyk
(74) *Attorney, Agent, or Firm* — McDermott Will and Emery LLP

(57) ABSTRACT

A manufacturing method of a glass panel for a glass panel unit includes a melting step, a spreading step, an annealing step, a cutting step, and a spacer disposition step. The spacer disposition step is a step of disposing spacers onto a glass sheet and is performed by a spacer disposition device prior to the cutting step.

6 Claims, 12 Drawing Sheets

(51) Int. Cl.
  *C03C 27/02* (2006.01)
  *C03B 23/24* (2006.01)
  *E06B 3/663* (2006.01)
  *C03B 25/02* (2006.01)
(52) U.S. Cl.
  CPC ............ *C03B 25/025* (2013.01); *C03C 27/02* (2013.01); *E06B 3/66304* (2013.01)

(56) References Cited

U.S. PATENT DOCUMENTS

| | | | |
|---|---|---|---|
| 2005/0087294 A1* | 4/2005 | Rabinowitz | F24S 23/82 |
| | | | 156/304.2 |
| 2006/0151089 A1 | 7/2006 | Kawamori | |
| 2009/0038343 A1* | 2/2009 | Gibson | C03C 17/00 |
| | | | 65/60.1 |
| 2014/0123707 A1 | 5/2014 | Hiromatsu et al. | |
| 2017/0328124 A1 | 11/2017 | Abe et al. | |

FOREIGN PATENT DOCUMENTS

| | | |
|---|---|---|
| JP | 2016-069232 A | 5/2016 |
| WO | 2005/000764 A1 | 1/2005 |
| WO | 2013/008896 A1 | 1/2013 |
| WO | 2016/084384 A1 | 6/2016 |

* cited by examiner

MANUFACTURING METHOD AND MANUFACTURING APPARATUS OF GLASS PANEL FOR GLASS PANEL UNIT

CROSS-REFERENCE OF RELATED APPLICATIONS

This application is the U.S. National Phase under 35 U.S.C. § 371 of International Patent Application No. PCT/JP2017/025120, filed on Jul. 10, 2017, which in turn claims the benefit of Japanese Application No. 2016-143803, filed on Jul. 21, 2016, the entire disclosures of which Applications are incorporated by reference herein.

TECHNICAL FIELD

The present invention relates to a manufacturing method and a manufacturing apparatus of a glass panel for a glass panel unit.

BACKGROUND ART

A glass panel unit is known which includes a pair of glass panels, a frame member disposed between the pair of glass panels to hermetically bind the pair of glass panels together, and spacers disposed in an inside space surrounded by the pair of glass panels and the frame member (see, for example, Patent Literature 1).

Such a conventional glass panel unit is manufactured as follows. A pair of glass panels cut into a prescribed size is prepared, and a frame member and spacers are placed on one of the glass panels and are bound to the other glass panel. Then, an inside space is evacuated, heating is performed to soften the frame member once so as to hermetically bind the pair of glass panels together, thereby obtaining a finished product as the glass panel unit.

The conventional glass panel unit requires a process of disposing, for each cut glass panel, the spacers thereon with the spacers positioned, which is a troublesome process.

It is an object of the present invention to provide a manufacturing method and a manufacturing apparatus of a glass panel for a glass panel unit, the manufacturing method and the manufacturing apparatus eliminating, a process of disposing, for each cut glass panel, spacers thereon with the spacers positioned.

CITATION LIST

Patent Literature

Patent Literature 1: JP 2016-69232 A

SUMMARY OF INVENTION

The present invention is a manufacturing method of a glass panel for a glass panel unit. The glass panel unit includes a pair of the glass panels facing each other with a prescribed distance therebetween, a frame member, an inside space, and a spacer. The frame member is disposed between the pair of glass panels to hermetically bind the pair of glass panels together. The inside space is surrounded by the pair of glass panels and the frame member. The spacer is in the inside space and is in contact with the pair of glass panels. The manufacturing method includes a melting step, a spreading step, an annealing step, a cutting step, and a spacer disposition step. The melting step is a step of melting a raw material of glass to produce melted glass. The spreading step is a step of spreading the melted glass onto melted metal to produce a glass sheet. The annealing step is a step of pulling out and annealing the glass sheet. The cutting step is a step of cutting the glass sheet annealed. The spacer disposition step is a step of disposing the spacer onto the glass sheet. The spacer disposition step is performed prior to the cutting step.

Moreover, the present invention is a manufacturing apparatus of a glass panel for a glass panel unit. The glass panel unit includes a pair of the glass panels facing each other with a prescribed distance therebetween, a frame member, an inside space, and a spacer. The frame member is disposed between the pair of glass panels to hermetically bind the pair of glass panels together. The inside space is surrounded by the pair of glass panels and the frame member. The spacer is in the inside space and is in contact with the pair of glass panels. The manufacturing apparatus includes, in order downstream of a flow of glass, a melting bath, a float bath, an annealing device, and a cutting device. The manufacturing apparatus includes a spacer disposition device disposed upstream of the cutting device. The melting bath is a device configured to melt a raw material of glass to produce melted glass. The float bath is a device configured to spread the melted glass onto melted metal to produce a glass sheet. The annealing device is a device configured to pull the glass sheet out of the float bath and anneal the glass sheet. The cutting device is a device configured to cut the glass sheet annealed. The spacer disposition device is a device configured to dispose the spacer onto the glass sheet.

DESCRIPTION OF EMBODIMENTS

First to fourth embodiments below each relate to a manufacturing method and a manufacturing apparatus of a glass panel for a glass panel unit.

Figure 1:
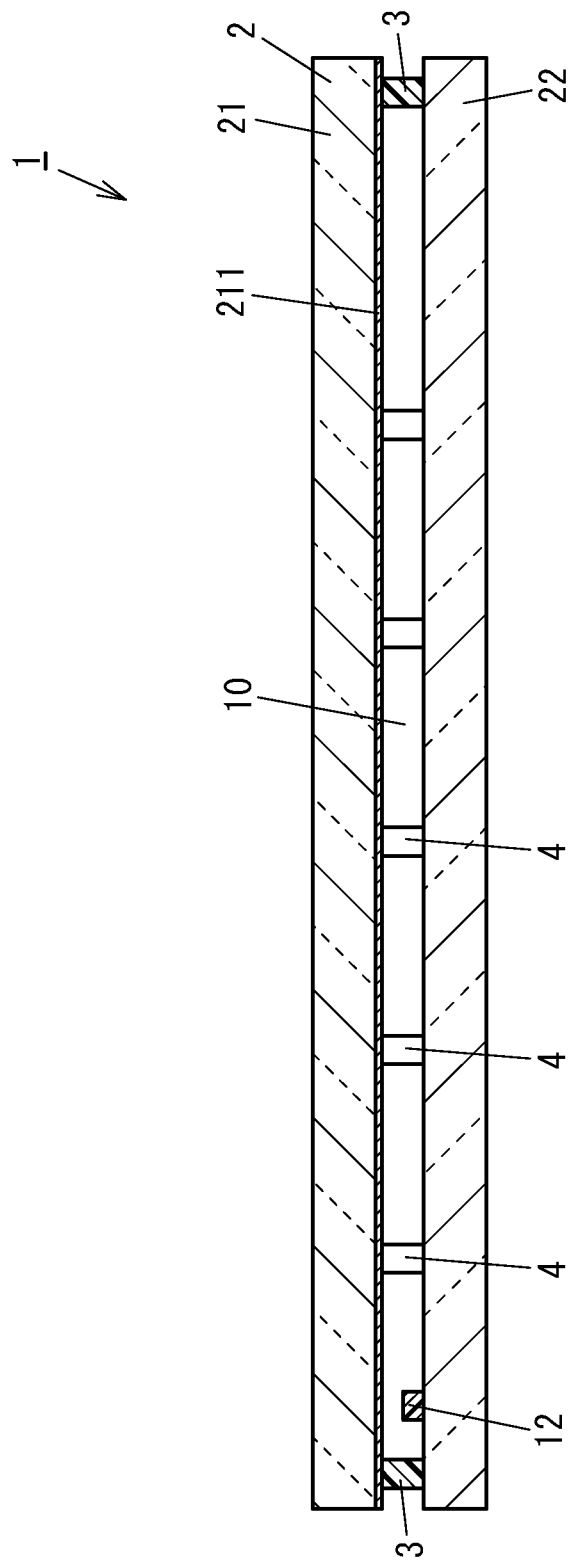
FIG. 1 is a sectional view illustrating a glass panel unit in a manufacturing method of a glass panel according to a first embodiment of the present invention.
Figure 2:
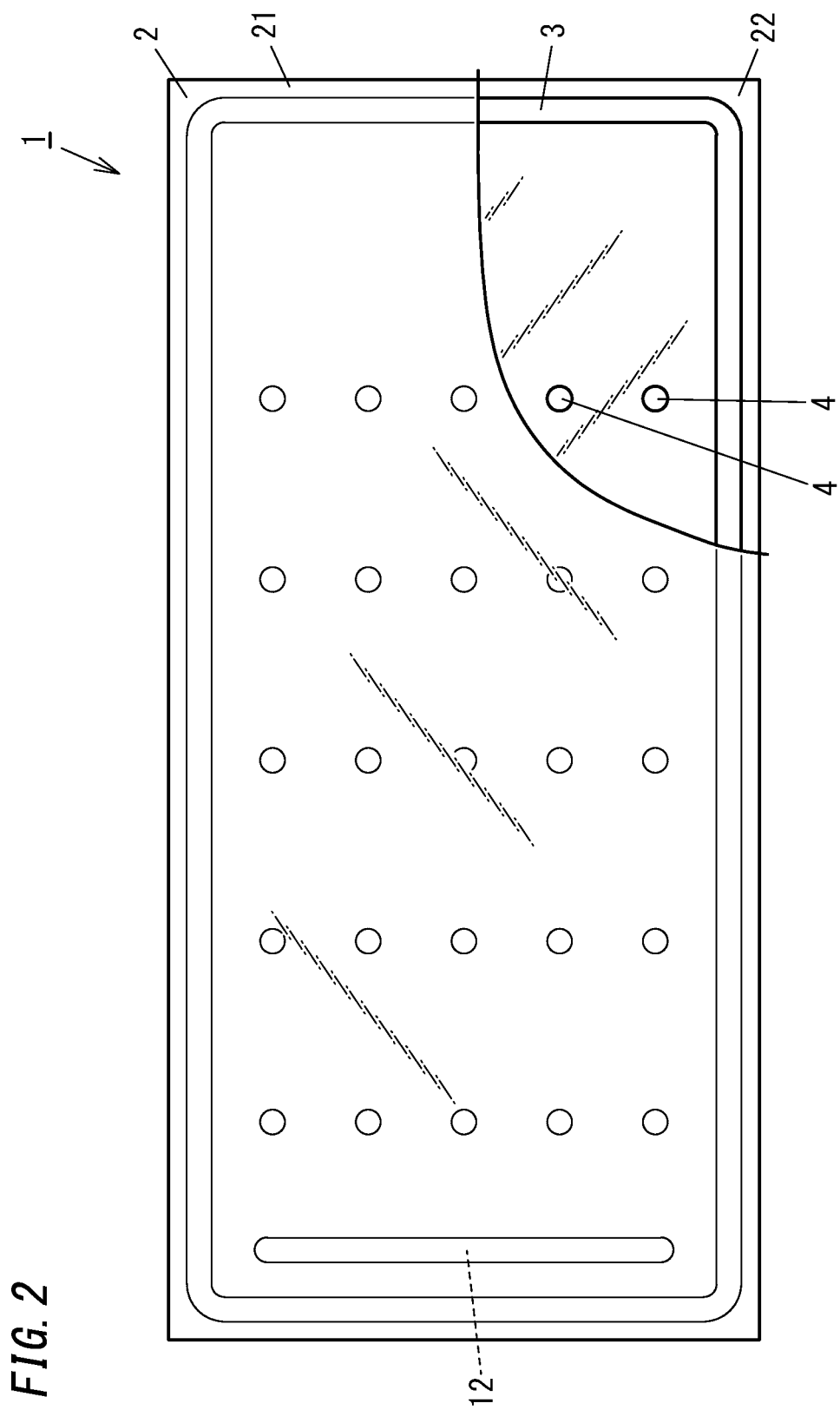
FIG. 2 is a partially cutaway plan view illustrating the glass panel unit.
Figure 3:
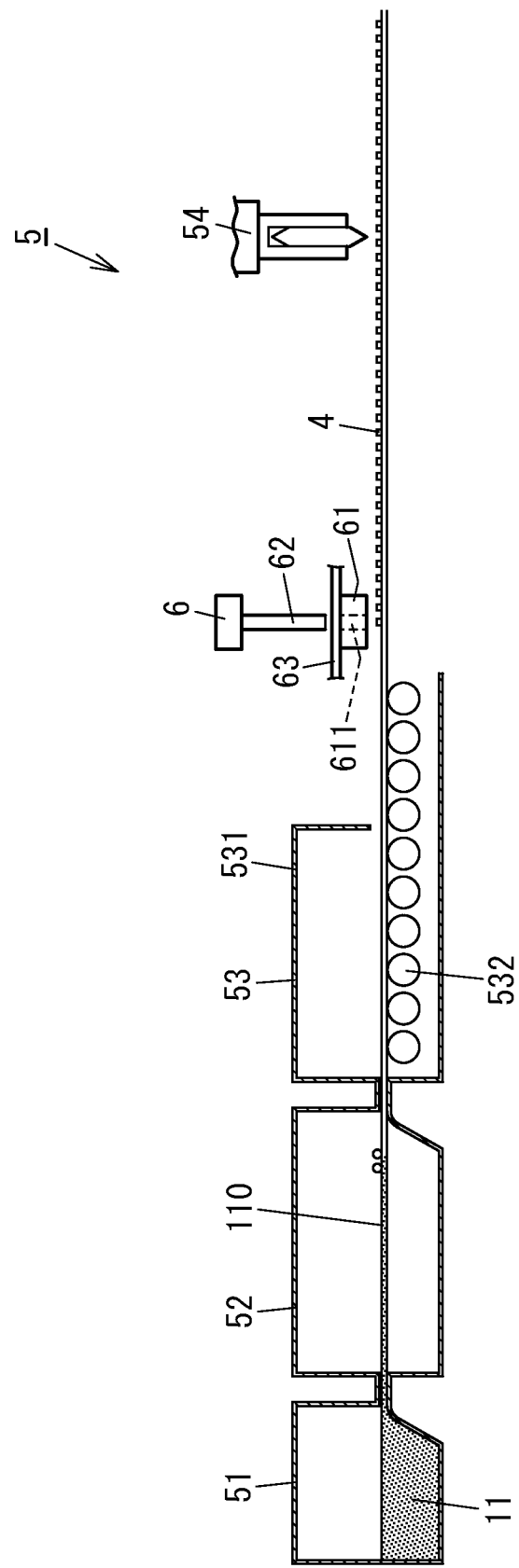
FIG. 3 is a view illustrating a structure of an apparatus used in the manufacturing method of the glass panel.

First, with reference to FIGS. 1 to 8, a manufacturing method and a manufacturing apparatus of a glass panel for a glass panel unit according to the first embodiment will be described. As illustrated in FIGS. 1 and 2, a glass panel unit 1 (finished product) includes a pair of glass panels 2 facing each other with a prescribed distance therebetween, a frame member 3, an inside space 10, and spacers 4.

The pair of glass panels 2 includes a first glass panel 21 and a second glass panel 22 facing each other with the prescribed distance therebetween.

The frame member 3 is disposed between the pair of glass panels 2, that is, between the first glass panel 21 and the second glass panel 22 to hermetically bind the first glass panel 21 and the second glass panel 22 together. Thus, the inside space 10 surrounded by the first glass panel 21, the second glass panel 22, and the frame member 3 is formed.

The spacers 4 are disposed in the inside space 10, are in contact with the first glass panel 21 and the second glass panel 22, and maintain the prescribed distance between the first glass panel 21 and the second glass panel 22.

The glass panel unit 1 is manufactured by a glass panel manufacturing process of producing glass panels 2 and a unit manufacturing process of assembling the glass panels 2 thus produced into the glass panel unit 1 (finished product). The first embodiment features a manufacturing method and a manufacturing apparatus 5 applied for the glass panel manufacturing process (see FIG. 3). First, with reference to FIG. 3, the manufacturing method and the manufacturing apparatus 5 of the glass panel 2 applied for the glass panel manufacturing process will be described.

The manufacturing method of the glass panel 2 (manufacturing process) includes a melting step, a spreading step, an annealing step, a cutting step, and a spacer disposition step. Moreover, the manufacturing apparatus 5 of the glass panel 2 includes a melting bath 51, a float bath 52, an annealing device 53, a cutting device 54, and a spacer disposition device 6.

The melting step is a step of melting a raw material 11 of glass to produce melted glass. The melting step is performed in the melting bath 51 in which the raw material 11 of glass is melted. The melting bath 51, together with a heating means for melting the raw material 11 of glass and other apparatuses, forms a melting device.

Examples of the raw material 11 of glass include sand, soda ash (sodium carbonate), dolomite, lime rock, and salt cake (sodium sulfate). Moreover, as the raw material 11 of glass, a coloring agent, a purifying agent, and a material for adjusting physical or chemical characteristics of the glass may be further added accordingly. The raw material 11 of glass is heated to about 1500° C. to 1600° C. by the heating means to become melted glass and is reserved in the melting bath 51.

The spreading step is a step of spreading the melted glass melted in the melting step onto melted metal to produce a glass sheet 110. The spreading step is performed in the float bath 52 in which the melted glass is spread onto the melted metal. The float bath 52, together with a heating means for melting the metal and other apparatuses, form a float bath device.

In the first embodiment, the float bath 52 reserves melted tin (not shown), and the melted glass spreads in a plate shape and gradually solidifies on an upper surface of the melted tin. Thus, it is possible to produce the glass sheet 110 which has a uniform thickness and having a very flat surface.

The annealing step is a step of pulling out and annealing the glass sheet 110. The annealing step is performed in the annealing device 53 in which the glass sheet 110 pulled out of the float bath 52 is annealed. The annealing device 53 includes a furnace 531 and a temperature adjustment device configured to adjust an ambient temperature in the furnace 531. As the temperature adjustment device, a publicly known temperature adjustment device is available.

The annealing device 53 includes rolls 532 and other necessary apparatuses such as a driving means thereof and transports the glass sheet 110 mounted on the rolls 532. The furnace 531 has a length (length in the transport direction of the glass sheet 110) of several tens of meters and a width (length in a direction orthogonal to the transport direction of the glass sheet 110) of about 10 m, but the length and the width are not limited to this embodiment. In the furnace 531, the glass sheet 110 has about 600° C. to 750° C. at an upstream end and about 200° C. to 400° C. at a downstream end, and the temperature linearly or non-linearly lowers from upstream to downstream between the upstream end and the downstream end.

The cutting step is a step of cutting the glass sheet 110 which has been annealed. The cutting step is performed by the cutting device 54 configured to cut the glass sheet 110 which has been annealed. The cutting device 54 includes, for example, a cutting blade and other apparatuses such as a driving means. As the cutting device 54, a publicly known cutting device is accordingly available.

In this embodiment, the melting bath 51, the float bath 52, the annealing device 53, and the cutting device 54 are provided in order downstream. In this embodiment, upstream and downstream of a flow of glass are referred to as "upstream" and "downstream", respectively. That is, the melted glass melted in the melting step then flows to the float bath 52, is thereafter transported to the annealing device 53, and is then transported to the cutting device 54, and thus, the melting step, the spreading step, the annealing step, and the cutting step are performed in this order.

In the first embodiment, the manufacturing apparatus 5 of the glass panel 2 further includes a control device configured to control the melting device including the melting bath 51, the float bath device including the float bath 52, the annealing device 53, and the cutting device 54. The control device includes, for example, a so-called microcomputer configured to operate in accordance with a program. As the control device, a publicly known control device is accordingly available.

The manufacturing method (manufacturing method not including a spacer disposition step described later) and the manufacturing apparatus (manufacturing apparatus not including a spacer disposition device 6 described later) of the glass panel 2 described above are, in general, commonly included in publicly known manufacturing methods and manufacturing apparatuses of so-called float glass. In the first embodiment, publicly known general variations of such manufacturing methods and manufacturing apparatuses of float glass are accordingly available.

The first embodiment features further inclusion of the spacer disposition step. The spacer disposition step is performed prior to the cutting step and is a step of disposing the spacers 4 onto the glass sheet 110. The spacer disposition step is performed by the spacer disposition device 6 configured to dispose the spacers 4 onto the glass sheet 110.

The spacer disposition device 6 is disposed downstream of the annealing device 53 and upstream of the cutting device 54.

In the first embodiment, the spacer disposition device 6 has a punching die 61 and a punch 62.

The punching die 61 is located above the glass sheet 110 and has a through hole 611. The punching die 61 has an upper surface on which a sheet 63 is provided to cover the through hole 611. The sheet 63 is made of the same material as the spacer 4, has the same thickness as the spacer 4, and has a larger area than the spacer 4.

The punch 62 is located above the punching die 61. The punch 62 has a columnar shape protruding downward and punches the sheet 63 provided on the punching die 61 downward through the through hole 611.

Moreover, the spacer disposition device 6 accordingly includes required apparatuses such as a driving means for driving the punch 62 and is controlled by the above-described control device. As the spacer disposition device 6, a publicly known device including such a punching die 61 and a punch 62 is accordingly available. Moreover, as the spacer disposition device 6, a so-called chip mounter is available. Note that the spacer disposition device 6 is not limited to the device including the punching die 61 and the punch 62 and the chip mounter. For example, a device for performing so-called "pick and place" of picking up a spacer 4 stocked by a sucking head and placing it in a desired location onto a glass sheet may be provided.

In a manufacturing method of the glass panel 2 with the above-described manufacturing apparatus 5, the raw material 11 of glass is first melted in the melting step to produce melted glass, the melted glass is then spread onto melted metal in the spreading step to produce the glass sheet 110, and thereafter, the glass sheet 110 is annealed in the annealing step.

Figure 4:
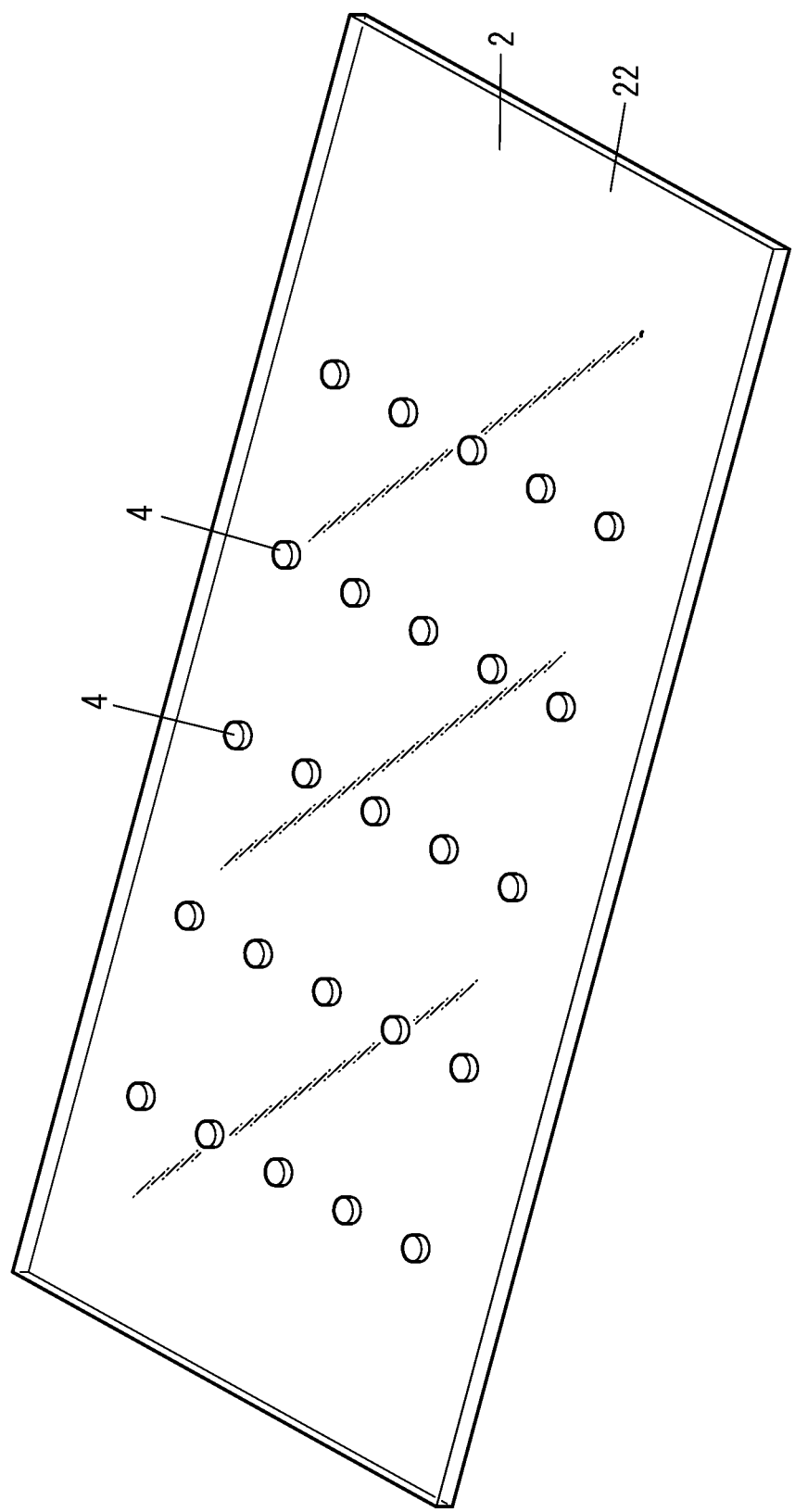
FIG. 4 is a perspective view illustrating a second glass panel manufactured by the manufacturing method of the glass panel.

Then, the spacers 4 are disposed on the glass sheet 110 in the spacer disposition step, and the glass sheet 110 is then cut in the cutting step. Thus, as illustrated in FIG. 4, the second glass panel 22 having a surface provided with the spacers 4 is obtained. Note that the first glass panel 21 is not provided with the spacers 4. That is, the first glass panel 21 is manufactured by a conventional glass panel manufacturing process including no spacer disposition step. Moreover, in the first embodiment, as illustrated in FIG. 1, the first glass panel 21 has a surface which faces the second glass panel 22 and which is provided with a coating 211 such as a so-called Low-E film, but the coating 211 does not have to be provided.

Next, the unit manufacturing process of assembling the glass panels 2 having a surface provided with the spacers 4 into the glass panel unit 1 will be described based on FIGS. 4 to 8.

The unit manufacturing process includes a disposition step, an assembling step, a hermetically sealing step, and a removal step.

The disposition step is a step of forming the first glass panel 21, the second glass panel 22, the frame member 3, the inside space 10, an exhaust port, and a gas adsorbent 12. The disposition step includes first to fourth steps.

The first step is a step (glass panel preparation step) of preparing the first glass panel 21 and the second glass panel 22. As the second glass panel 22, the above-described glass panel 2 having the surface provided with the spacers 4 illustrated in FIG. 4 is used, and as the first glass panel 21, a glass panel 2 having a surface provided with no spacer 4 is used.

Figure 5:
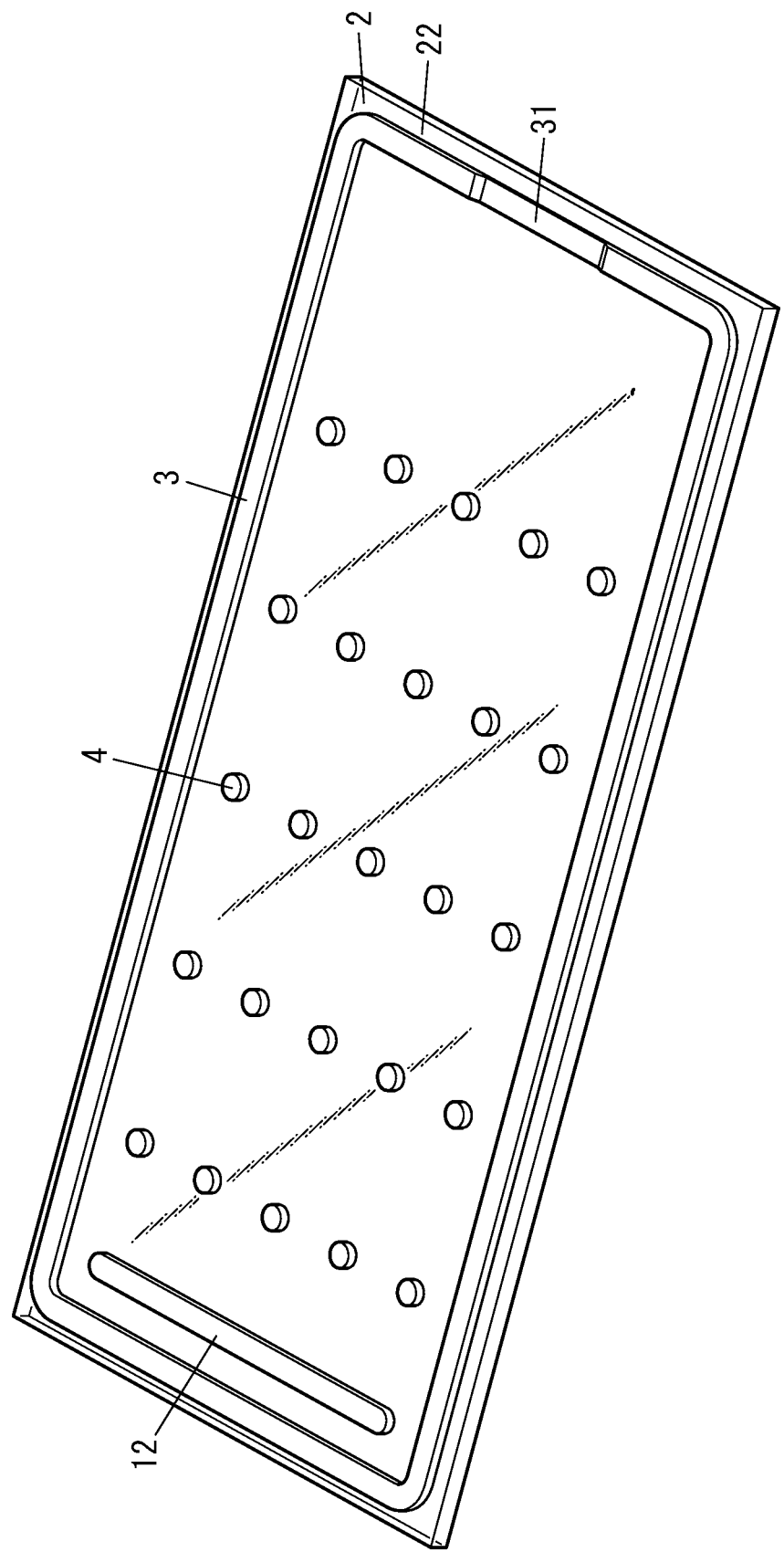
FIG. 5 is a perspective view illustrating the second glass panel after a second step in a disposition step in a unit manufacturing process for the manufacturing method.

As illustrated in FIG. 5, the second step is a step (seal member forming step) of forming a seal (frame member 3). In the second step, a material (thermal adhesive) as the frame member 3 is applied to the second glass panel 22 with a dispenser or the like.

At this time, as illustrated in FIG. 5, the frame member 3 includes a part formed as a low step part 31 having a smaller thickness than the other parts. The low step part 31 forms the exhaust port of a pre-fabricated component.

Note that the exhaust port does not have to be formed of the low step part 31. For example, an exhaust hole may be formed in the first glass panel 21 or the second glass panel 22. When the exhaust hole is formed in the first glass panel 21 or the second glass panel 22, an exhaust pipe having an inner diameter larger than the exhaust hole is connected to the exhaust port by a well-known method adopting glass welding or melted metal serving as a welding member. A vacuum space may be formed by a so-called chip-off process of performing evacuation through the exhaust pipe and after an evacuation step, sealing a tip portion of the exhaust pipe to hermetically close a space.

The third step is a step (gas adsorbent forming step) of forming the gas adsorbent 12. In the third step, a solution containing powder of a getter dispersed therein is applied to a prescribed location on the second glass panel 22 and is dried, thereby forming the gas adsorbent 12.

Note that the method for forming the gas adsorbent 12 is not limited to this embodiment. A gas adsorbent 12 containing powder of a getter may be formed into a pellet in a tablet shape in advance and may be disposed in a prescribed location on the second glass panel 22. In this case, a recess may be formed by scraping the surface of the second glass panel 22 in a shape matching the tablet shape, and the gas adsorbent 12 may be inserted in the recess.

After the first step to the third step are finished, the second glass panel 22 provided with the frame member 3, the gas adsorbent 12, the plurality of spacer 4 as illustrated in FIG. 5 is obtained.

Figure 6:
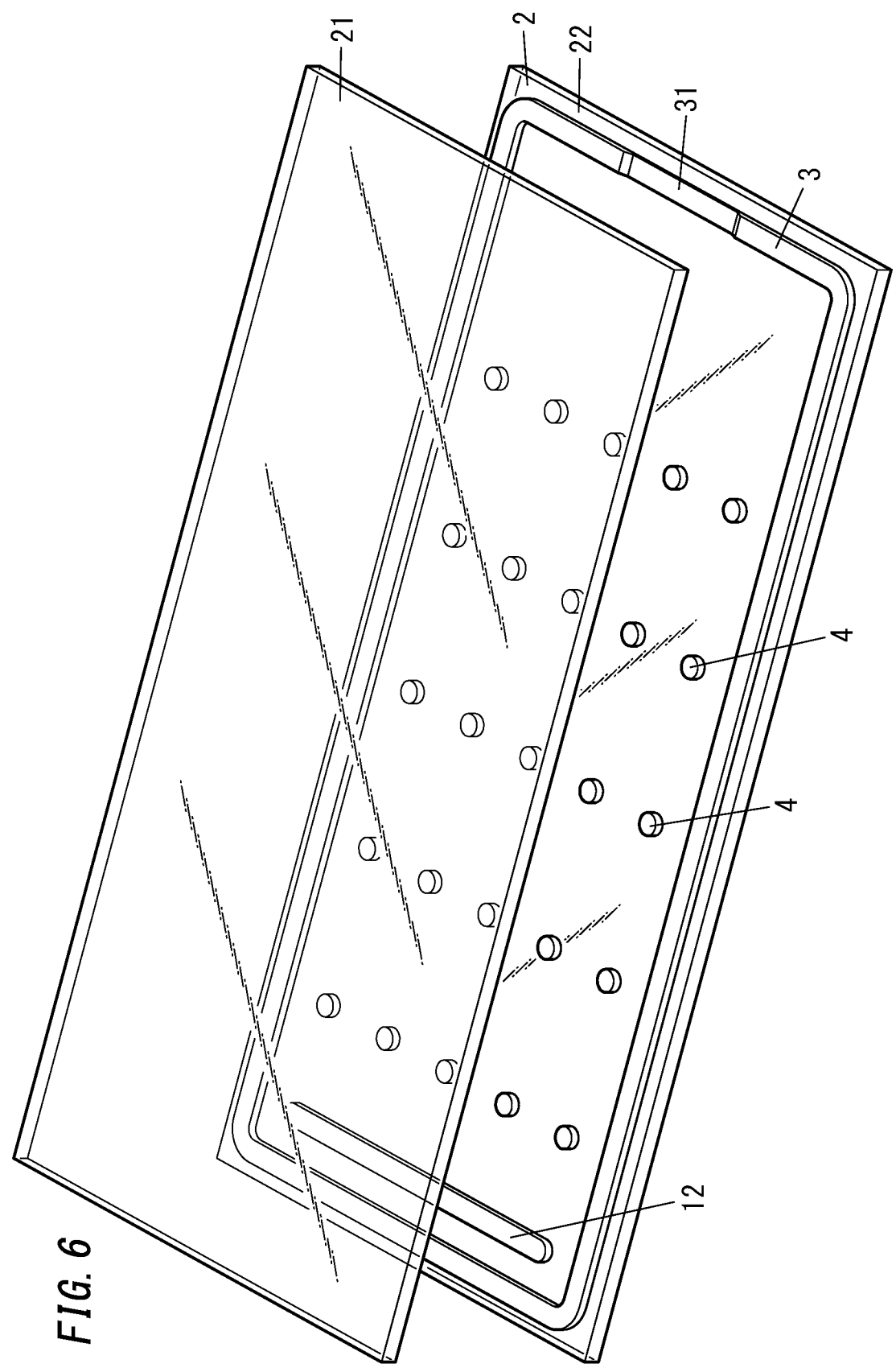
FIG. 6 is a perspective view illustrating a first glass panel and a second glass panel in a fifth step in the disposition step.

The fourth step is a step (overlaying step) of disposing the first glass panel 21 and the second glass panel 22. As illustrated in FIG. 6, in the fourth step, the first glass panel 21 is laid over the second glass panel 22 such that the first glass panel 21 and the second glass panel 22 are parallel to each other and face each other.

The assembling step is a step (first melting step) of hermetically binding the first glass panel 21 and the second glass panel 22 with the frame member 3.

Figure 7:
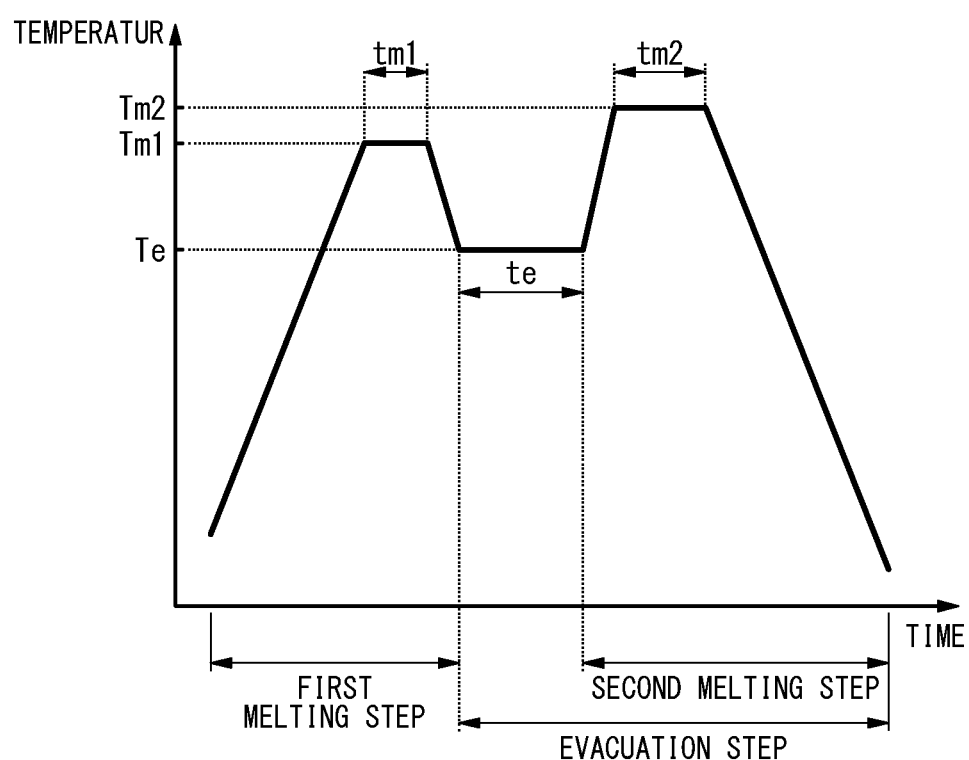
FIG. 7 is a time chart of a temperature illustrating a first melting step, an evacuation step, and a second melting step in a hermetically sealing step of the unit manufacturing process.

In the first melting step, as illustrated in FIG. 7, the thermal adhesive is melted once at a prescribed temperature (first melting temperature) Tm1 higher than or equal to the softening point of the thermal adhesive to hermetically bind the first glass panel 21 and the second glass panel 22 together. The first glass panel 21 and the second glass panel 22 are disposed in a chamber and heated at the first melting temperature Tm1 for a predetermined time (first melting time) tm1.

Figure 8:
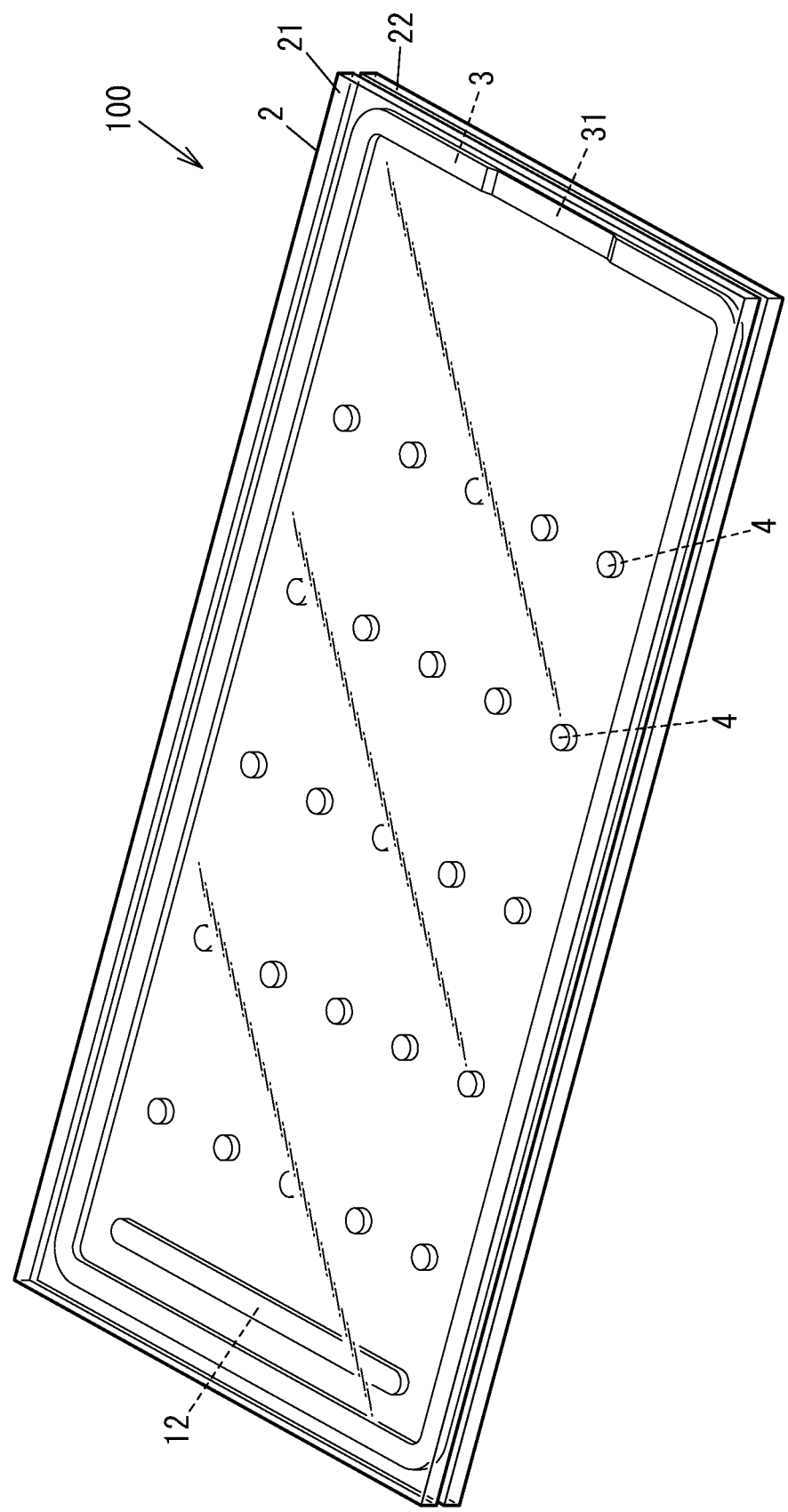
FIG. 8 is a perspective view illustrating a pre-fabricated component after an assembling step in the unit manufacturing process.

The above-described assembling step (first melting step) provides a pre-fabricated component 100 shown in FIG. 8.

Then, the hermetically sealing step (the evacuation step and a melting step (second melting step)) is performed. In the evacuation step, as illustrated in FIG. 7, the inside space 10 is evacuated through the exhaust port for a predetermined time (exhaust time) to during which only evacuation is performed at a prescribed temperature (exhaust temperature) Te, thereby creating a vacuum in the inside space 10.

In the second melting step, the thermal adhesive is melted once by being heated at a prescribed temperature (second melting temperature) Tm2 higher than or equal to the softening point for a predetermined time (second melting time) tm2, and thereby, the first glass panel 21 and the second glass panel 22 are pressed by atmospheric pressure and the thermal adhesive is compressed, so that the low step part 31 is closed. In this way, it is possible to from the seal (frame member 3) for maintaining the inside space 10 as a hermetically closed space. Note that the first melting temperature Tm1 is lower than the second melting temperature Tm2. The second melting step includes a time until the temperature increases from the prescribed temperature (exhaust temperature) Te to the prescribed temperature (second melting temperature) Tm2 and a time until the temperature decreases from the prescribed temperature (second melting temperature) Tm2 to the ordinary temperature. During a period during which the second melting step is performed, the inside space 10 is evacuated while the vacuum space is maintained.

Then, a removal step of removing unnecessary parts is performed, and then, the pre-fabricated component 100 is subjected to prescribed processes, thereby providing the glass panel unit 1 (finished product) illustrated in FIGS. 1 and 2.

As described above, in the first embodiment, the glass panel manufacturing process includes the spacer disposition step. Therefore, the spacers 4 are disposed onto the glass panel 2 before the glass sheet 110 continuously produced is cut. Thus, the disposition of the spacers 4 can be performed as a part of the production process of the glass sheet 110 continuously produced. This, unlike the case where the spacers 4 are disposed after the cutting step, eliminates a troublesome process of disposing, for each glass panel 2, the spacers 4 thereon, with the spaces 4 positioned.

Note that the spacers 4 or the frame member 3 may be formed by application of a mixture of low melting glass and an organic binder with a dispenser. After the application and before cutting of the glass sheet 110, a re-heating step of performing re-heating to remove the organic binder may be performed. In the re-heating step, in order to remove the organic binder, the re-heating is performed to achieve at least a temperature (of about 100° C. to 200° C.) which is higher than or equal to the boiling point or the decomposition point of the organic binder, and in order to melt the low melting glass so as to fuse the first glass panel to the spacers 4 or to the frame member 3, the re-heating is performed to achieve a temperature (for example, higher than or equal to 400° C.) which is higher than or equal to the melting point of the low melting glass. The re-heating step enables pre-treatment of the spacers 4 or the frame member 3 before the cutting step, and therefore, the glass panel unit can be efficiently manufactured.

Moreover, the material for the spacers 4 is not limited to glass but may be, for example, metal or a resin.

Figure 9:
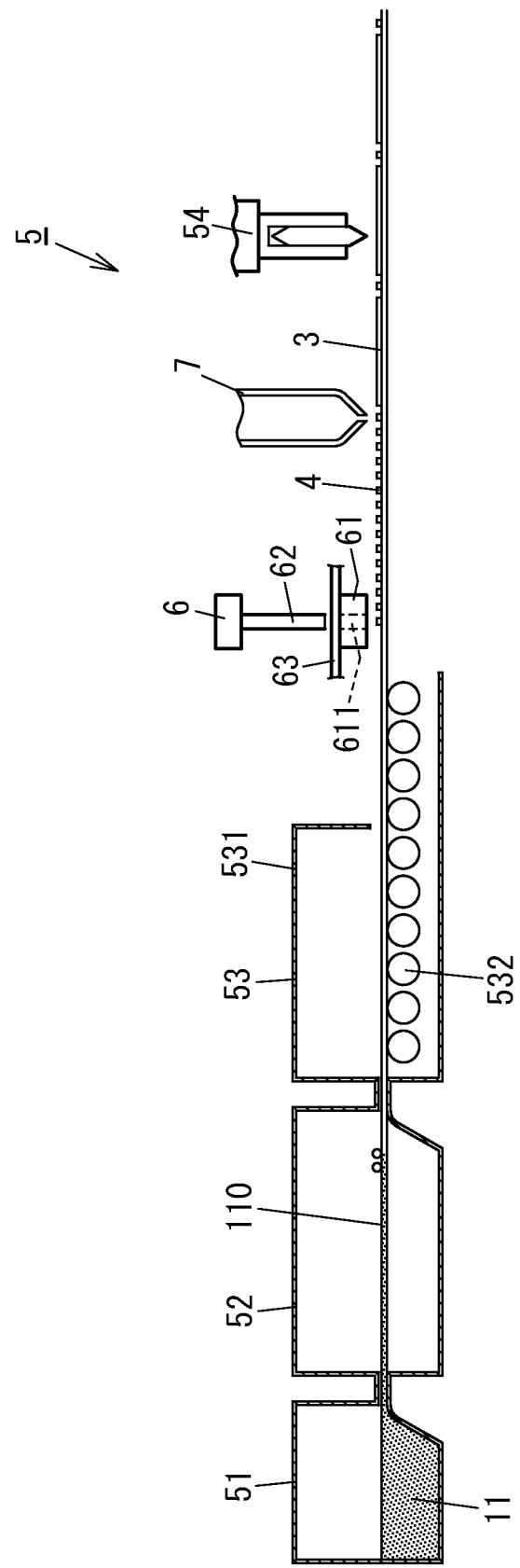
FIG. 9 is a view illustrating a configuration of an apparatus used in a manufacturing method of a glass panel according to a second embodiment of the present invention.
Figure 10:
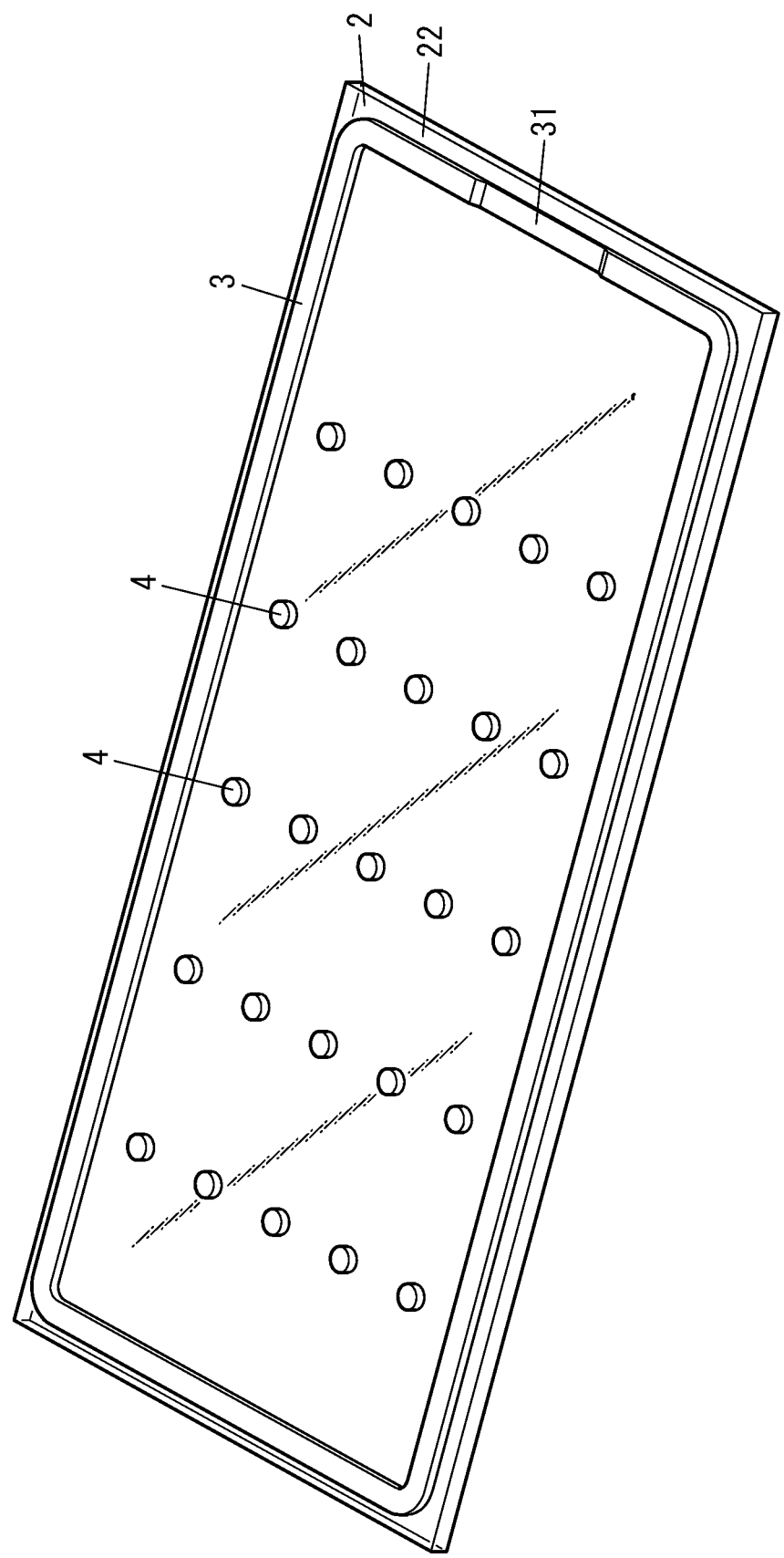
FIG. 10 is a perspective view illustrating a glass panel (second glass panel) manufactured by the manufacturing method of the glass panel.

Next, with reference to FIGS. 9 and 10, a manufacturing method and a manufacturing apparatus 5 of a glass panel 2 for a glass panel unit 1 according to a second embodiment will be described. Note that the manufacturing method and the manufacturing apparatus 5 of the glass panel 2 for the glass panel unit 1 according to the second embodiment are the same as those in the first embodiment in large part. Therefore, components the same as those in the first embodiment are denoted by the same reference signs, the description thereof is omitted, and components different from those in the first embodiment are mainly described.

The second embodiment includes a frame member disposition step of disposing a frame member 3 onto a glass sheet 110. The frame member disposition step is performed prior to the cutting step in the first embodiment. As illustrated in FIG. 9, the frame member disposition step is performed by a frame member disposition device 7 configured to dispose the frame member 3 onto the glass sheet 110. That is, in the second embodiment, the manufacturing apparatus 5 of the glass panel 2 for the glass panel unit 1 further includes the frame member disposition device 7. The frame member disposition device 7 is disposed downstream of a spacer disposition device 6 and upstream of a cutting device 54 but may be disposed upstream of the spacer disposition device 6 and downstream of an annealing device 53.

The frame member disposition device 7 includes a dispenser similar to that used in the second step (seal member forming step) of the disposition step of the unit manufacturing process in the first embodiment. Similarly to the seal member forming step, the frame member disposition device 7 applies a material (thermal adhesive) for the frame member 3 to a second glass panel 22.

In the second embodiment, the second step (seal member forming step) of the disposition step of the unit manufacturing process is omitted. That is, a disposition step in the second embodiment includes only a first step (glass panel preparation step), a third step (gas adsorbent forming step), and a fourth step (overlaying step).

In the manufacturing method of the glass panel 2 with the manufacturing apparatus 5 according to the second embodiment, a raw material 11 of glass is first melted in a melting step to produce melted glass, the melted glass is then spread onto melted metal in a spreading step to produce the glass sheet 110, and thereafter, the glass sheet 110 is annealed in an annealing step.

Then, spacers 4 are disposed on the glass sheet 110 in a spacer disposition step, and the frame member 3 is thereafter disposed on the glass sheet 110 in the frame member disposition step, and the glass sheet 110 is then cut in a cutting step. This provides, as illustrated in FIG. 10, the second glass panel 22 having a surface provided with the spacers 4 and the frame member 3. Note that a first glass panel 21 is provided with neither the spacers 4 nor the frame member 3. That is, the first glass panel 21 is manufactured by a conventional glass panel manufacturing process including neither the spacer disposition step nor the frame member disposition step.

As described above, in the second embodiment, a glass panel manufacturing process further includes the frame member disposition step. Therefore, disposition of the frame member 3 onto the glass panel 2 is performed before the glass sheet 110 continuously produced is cut. Thus, the disposition of the frame member 3 can be performed as a part of the production process of the glass sheet 110 continuously produced. This, unlike the case where the frame member 3 is disposed after the cutting step, eliminates a troublesome process of, disposing, for each glass panel 2, the frame member 3 thereon with the frame member 3 positioned.

Next, with reference to FIG. 11, a manufacturing method and a manufacturing apparatus 5 of a glass panel 2 for a glass panel unit 1 according to a third embodiment will be described. Note that the manufacturing method and the manufacturing apparatus 5 of the glass panel 2 for the glass panel unit 1 according to the third embodiment are the same as those in the first embodiment in large part. Therefore, components the same as those in the first embodiment are denoted by the same reference signs, the description thereof is omitted, and components different from those in the first embodiment are mainly described.

In the first embodiment, the spacer disposition step is performed after the annealing step and before the cutting step. In contrast, in the third embodiment, an annealing step includes a spacer disposition step. The spacer disposition step is a step of disposing spacers 4 by dropping hot-melt glass.

Figure 11:
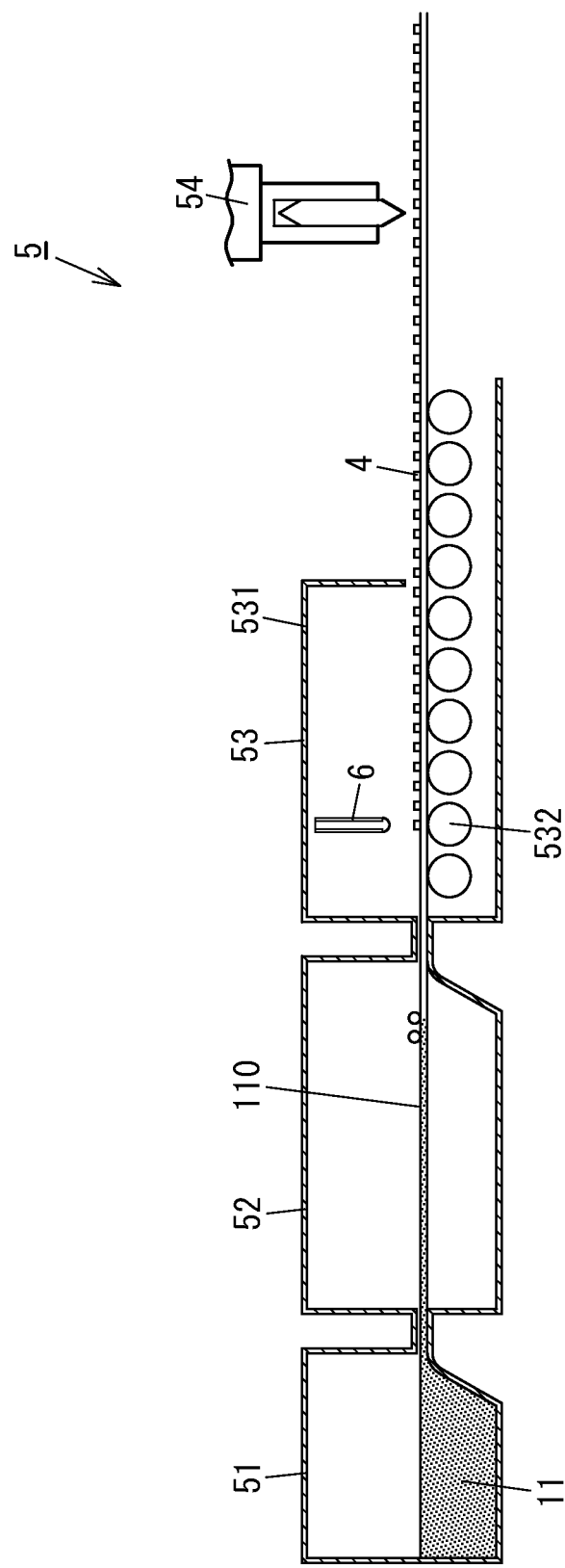
FIG. 11 is a view illustrating a configuration of an apparatus used in a manufacturing method of a glass panel according to a third embodiment of the present invention.

As illustrated in FIG. 11, a spacer disposition device 6 configured to perform the spacer disposition step is disposed in an annealing device 53. The spacer disposition device 6 is a device configured to dispose the spacers 4 by dropping the hot-melt glass serving as a material for the spacers 4.

The hot-melt glass serving as the material for the spacers 4 is dropped onto a glass sheet 110 with the spacer disposition device 6 and cooled, thereby forming the spacers 4 at prescribed locations.

In a manufacturing method of the glass panel 2 with the manufacturing apparatus 5 according to the third embodiment, a raw material 11 of glass is first melted in a melting step to produce melted glass, the melted glass is then spread onto melted metal in a spreading step to produce the glass sheet 110, and thereafter, the spacers 4 are disposed onto the glass sheet 110 in the spacer disposition step, while the glass sheet 110 is annealed in the annealing step. The glass sheet 110 is then cut in a cutting step. Thus, as illustrated in FIG. 4, a second glass panel 22 having a surface provided with the spacers 4 is obtained.

Subsequent unit manufacturing process is similar to that in the first embodiment.

As described above, in the third embodiment, the annealing step includes the spacer disposition step. Therefore, while energy is saved by using residual heat of the annealing step, the spacers 4 can be easily formed.

Note that for the location of the spacer disposition device 6 in the annealing device 53, the melting point of the hot-melt glass serving as the material for the spacer 4 and the temperature in the annealing device 53 have to be taken into consideration. Preferably, the difference between the melting point of the hot-melt glass serving as the material for the spacer 4 and the temperature of the glass sheet 110 at a location to which the hot-melt glass is dropped from the spacer disposition device 6 is smaller than or equal to 100° C. For example, when the melting point of the hot-melt glass is 600° C., the hot-melt glass is preferably dropped onto the glass sheet 110 from the spacer disposition device 6 in an area at which the temperature in a furnace 531 is 700° C. to 600° C. If the location onto which the hot-melt glass is dropped is a location where the temperature of the glass sheet 110 is lower than the melting point of the hot-melt glass, a crack may be formed in the glass sheet 110 due to the temperature difference, and if the location onto which the hot-melt glass is dropped is a location where the temperature of the glass sheet 110 is higher than the melting point of the hot-melt glass, the spacers 4 may be broken.

Figure 12:
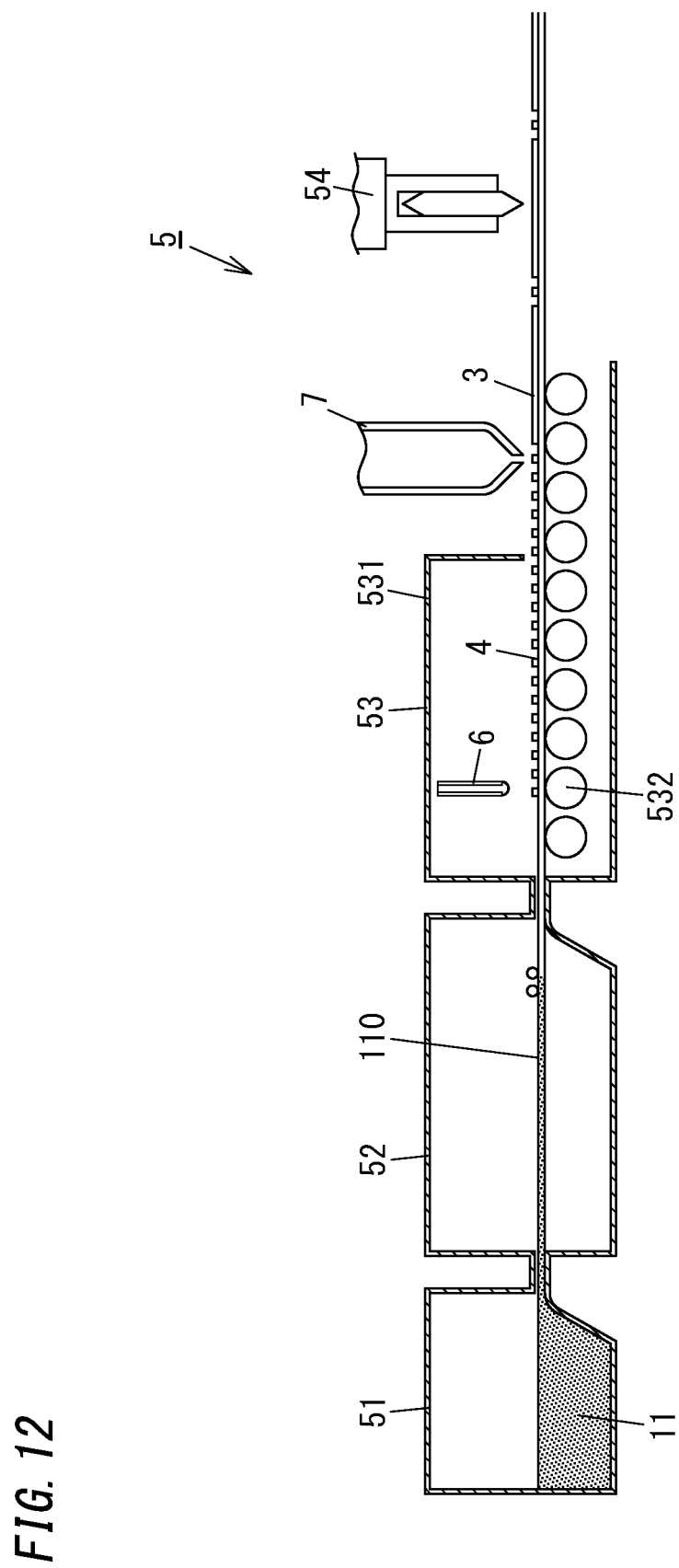
FIG. 12 is a view illustrating a configuration of an apparatus used in a manufacturing method of a glass panel according to a fourth embodiment of the present invention.

Next, with reference to FIG. 12, a manufacturing method and a manufacturing apparatus 5 of a glass panel 2 for a glass panel unit 1 according to a fourth embodiment will be described. Note that the manufacturing method and the manufacturing apparatus 5 of the glass panel 2 for the glass panel unit 1 according to the fourth embodiment are the same as those in the second embodiment in large part. Therefore, components the same as those in the second embodiment are denoted by the same reference signs, the description thereof is omitted, and components different from those in the second embodiment are mainly described.

In the second embodiment, the spacer disposition step is performed after the annealing step and before the cutting step. In contrast, in the fourth embodiment, an annealing step includes a spacer disposition step. The spacer disposition step is a step of disposing spacers 4 by dropping hot-melt glass. In this regard, the fourth embodiment is similar to the third embodiment, and a spacer disposition device 6 and a disposition location thereof are also similar to those in the third embodiment.

In the manufacturing method of the glass panel 2 with the manufacturing apparatus 5 according to the fourth embodiment, a raw material 11 of glass is first melted in a melting step to produce melted glass, the melted glass is then spread onto melted metal in a spreading step to produce a glass sheet 110, and thereafter, the spacers 4 are disposed onto the glass sheet 110 in the spacer disposition step, while the glass sheet 110 is annealed in the annealing step. A frame member 3 is thereafter disposed on the glass sheet 110 in a frame member disposition step, and the glass sheet 110 is then cut in a cutting step. This provides a second glass panel 22 having a surface provided with the spacers 4 and the frame member 3 (see FIG. 10).

Subsequent unit manufacturing process is similar to that in the third embodiment.

As described above, in the fourth embodiment, the annealing step includes the spacer disposition step. Therefore, while energy is saved by using residual heat of the annealing step, the spacers 4 can be easily formed.

Moreover, the temperature of the glass sheet 110 in a location to which the hot-melt glass serving as a material for the spacers 4 is dropped is adjustable by changing a location (location in a transportation direction of the glass sheet 110) to which the hot-melt glass serving as the material for the spacers 4 is dropped.

As can be seen from the above-described first to fourth embodiments, a manufacturing method of a glass panel 2 for a glass panel unit 1 of a first aspect according to the present invention includes a melting step, a spreading step, an annealing step, a cutting step, and a spacer disposition step. The glass panel unit 1 includes a pair of glass panels 2 disposed with a prescribed distance therebetween, a frame member 3, an inside space 10, and a spacer 4. The frame member 3 is disposed between the pair of glass panels 2 to hermetically bind the pair of glass panels 2 together. The inside space 10 is surrounded by the pair of glass panels 2 and the frame member 3. The spacer 4 is in the inside space 10 and is in contact with the pair of glass panels 2. The melting step is a step of melting a raw material 11 of glass to produce melted glass. The spreading step is a step of spreading the melted glass onto melted metal to produce a glass sheet 110. The annealing step is a step of pulling out and annealing the glass sheet 110. The cutting step is a step of cutting the glass sheet 110 annealed. The spacer disposition step is a step of disposing the spacer 4 onto the glass sheet 110. The spacer disposition step is performed prior to the cutting step.

The manufacturing method of the glass panel 2 for the glass panel unit 1 of the first aspect includes the spacer disposition step. Therefore, the spacer 4 is disposed onto the glass panel 2 before the glass sheet 110 continuously produced is cut. Thus, the disposition of the spacer 4 can be performed as a part of the production process of the glass sheet 110 continuously produced. This, unlike the case where the spacer 4 is disposed after the cutting step, eliminates a troublesome process of disposing, for each glass panel 2, the spaces 4 thereon with the spacers 4 positioned.

A manufacturing method of a glass panel 2 for a glass panel unit 1 of a second aspect of the present invention is additional and is realized in combination with the manufacturing method of the glass panel 2 for the glass panel unit 1 of the first aspect. The manufacturing method of the glass panel 2 for the glass panel unit 1 of the second aspect includes a frame member disposition step of disposing the frame member 3 onto the glass sheet 110. The frame member disposition step is performed prior to the cutting step.

The manufacturing method of the glass panel 2 for the glass panel unit 1 of the second aspect further includes the frame member disposition step. Therefore, disposition of the frame member 3 onto the glass panel 2 is performed before the glass sheet 110 continuously produced is cut. Thus, the disposition of the frame member 3 can be performed as a part of the production process of the glass sheet 110 continuously produced. This, unlike the case where the frame member 3 is disposed after the cutting step, eliminates a troublesome process of disposing, for each glass panel 2, the frame member 3 thereon with the frame member 3 positioned.

A manufacturing method of a glass panel 2 for a glass panel unit 1 of a third aspect of the present invention is additional and is realized in combination with the manufacturing method of the glass panel 2 for the glass panel unit 1 of the first or second aspect. In the manufacturing method of the glass panel 2 for the glass panel unit 1 of the third aspect, the annealing step includes the spacer disposition step, and the spacer disposition step is a step of disposing the spacer 4 by dropping hot-melt glass serving as a material for the spacer 4.

In the manufacturing method of the glass panel 2 for the glass panel unit 1 of the third aspect, the annealing step includes the spacer disposition step. Therefore, while energy is saved by using residual heat of the annealing step, the spacer 4 can be easily formed.

A manufacturing apparatus 5 of a glass panel 2 for a glass panel unit 1 according to a first aspect of the present invention includes, in order downstream of a flow of the glass, a melting bath 51, a float bath 52, an annealing device 53, and a cutting device 54. The manufacturing apparatus 5 includes a spacer disposition device 6 disposed upstream of the cutting device 54. The glass panel unit 1 includes a pair of glass panels 2 disposed with a prescribed distance therebetween, a frame member 3, an inside space 10, and a spacer 4. The frame member 3 is disposed between the pair of glass panels 2 to hermetically bind the pair of glass panels 2 together. The inside space 10 is surrounded by the pair of glass panels 2 and the frame member 3. The spacer 4 is in the inside space 10 and is in contact with the pair of glass panels 2. The melting bath 51 is a device in which a raw material 11 of the glass is melted to produce melted glass. The float bath 52 is a device in which the melted glass is spread onto melted metal to produce a glass sheet 110. The annealing device 53 is a device configured to pull out and anneal the glass sheet 110. The cutting device 54 is a device configured to cut the glass sheet 110 annealed. The spacer disposition device 6 is a device configured to dispose the spacer 4 onto the glass sheet 110.

The manufacturing apparatus 5 of the glass panel 2 for the glass panel unit 1 according to the first aspect includes the spacer disposition device 6. Therefore, the spacer 4 is disposed onto the glass panel 2 before the glass sheet 110 continuously produced is cut. Thus, the disposition of the spacer 4 can be performed as a part of the production process of the glass sheet 110 continuously produced. This, unlike the case where the spacer 4 is disposed after the glass sheet is cut, eliminates a troublesome process of disposing, for each glass panel 2, the spacer 4 thereon with the spacer 4 positioned.

A manufacturing apparatus 5 of a glass panel 2 for a glass panel unit 1 according to a second aspect of the invention is additional and is realized in combination with the manufacturing apparatus 5 of the glass panel 2 for the glass panel unit 1 according to the first aspect. The manufacturing apparatus 5 of the glass panel 2 for the glass panel unit 1 according to the second aspect includes a frame member disposition device 7 configured to dispose the frame member 3 onto the glass sheet 110.

The manufacturing apparatus 5 of the glass panel 2 for the glass panel unit 1 according to the second aspect further includes the frame member disposition device 7. Therefore, disposition of the frame member 3 onto the glass panel 2 is performed before the glass sheet 110 continuously produced is cut. Thus, the disposition of the frame member 3 can be performed as a part of the production process of the glass sheet 110 continuously produced. This, unlike the case where the frame member 3 is disposed after the glass sheet is cut, eliminates a troublesome process of disposing, for each glass panel 2, the frame member 3 with the frame member 3 positioned.

A manufacturing apparatus 5 of a glass panel 2 for a glass panel unit 1 according to a third aspect of the present invention is additional and is realized in combination with the manufacturing apparatus 5 of the glass panel 2 for the glass panel unit 1 according to the first aspect or the second aspect. In the manufacturing apparatus 5 of the glass panel 2 for the glass panel unit 1 according to the third aspect, the spacer disposition device 6 is disposed in the annealing device 53. The spacer disposition device 6 is a device configured to dispose the spacer 4 by dropping hot-melt glass serving as a material for the spacer 4.

The manufacturing apparatus 5 of the glass panel 2 for the glass panel unit 1 according to the third aspect, the spacer disposition device is disposed in the annealing device 53. Therefore, while energy is saved by using residual heat of an annealing step, the spacer 4 can be easily formed.

REFERENCE SIGNS LIST

1 Glass Panel Unit
10 Inside Space
11 Raw Material
2 Glass Panel
3 Frame Member
4 Spacer
5 Manufacturing Apparatus
51 Melting Bath
52 Float Bath
53 Annealing Device
54 Cutting Device
6 Spacer Disposition Device
7 Frame Member Disposition Device

The invention claimed is:

1. A manufacturing method of a glass panel for a glass panel unit including a pair of glass panels facing each other with a prescribed distance therebetween, a frame member disposed between the pair of glass panels to hermetically bind the pair of glass panels together, an inside space surrounded by the pair of glass panels and the frame member, and a spacer being in the inside space and being in contact with the pair of glass panels, the manufacturing method comprising:
- a melting step of melting a raw material of glass to produce melted glass;
- a spreading step of spreading the melted glass onto melted metal to produce a glass sheet;
- an annealing step of pulling out and annealing the glass sheet;
- a cutting step of cutting the glass sheet annealed; and
- a spacer disposition step of disposing the spacer onto the glass sheet, the spacer disposition step being performed prior to the cutting step.

2. The manufacturing method of the glass panel for the glass panel unit according to claim 1, further comprising:
- a frame member disposition step of disposing the frame member onto the glass sheet, wherein
- the frame member disposition step is performed prior to the cutting step.

3. The manufacturing method of the glass panel for the glass panel unit according to claim 1, wherein
- the annealing step includes the spacer disposition step, and
- the spacer disposition step is a step of disposing the spacer by dropping hot-melt glass serving as a material for the spacer.

4. A manufacturing apparatus of a glass panel for a glass panel unit including a pair of glass panels facing each other with a prescribed distance therebetween, a frame member disposed between the pair of glass panels to hermetically bind the pair of glass panels together, an inside space surrounded by the pair of glass panels and the frame member, and a spacer being in the inside space and being in contact with the pair of glass panels, the manufacturing apparatus comprising, in order downstream of a flow of glass,
- a melting bath in which a raw material of glass is melted to produce melted glass;
- a float bath in which the melted glass is spread onto melted metal to produce a glass sheet;
- an annealing device configured to pull the glass sheet out of the float bath and anneal the glass sheet; and
- a cutting device configured to cut the glass sheet annealed, wherein
- the manufacturing apparatus further comprises a spacer disposition device that is disposed upstream of the cutting device and configured to dispose the spacer onto the glass sheet.

5. The manufacturing apparatus of the glass panel for the glass panel unit according to claim 4, comprising:
- a frame member disposition device configured to dispose the frame member onto the glass sheet.

6. The manufacturing apparatus of the glass panel for the glass panel unit according to claim 4, wherein
- the spacer disposition device is disposed in the annealing device, and
- the spacer disposition device is configured to drop hot-melt glass serving as a material for the spacer to dispose the spacer.

* * * * *